United States Patent Office 3,336,290
Patented Aug. 15, 1967

3,336,290
PROCESS OF PREPARING ORGANIC ESTERS OF CELLULOSE
Weat Carl Mattis, Waynesboro, Va., assignor to E. I. du Pont de Nemours and Company, Wilmington, Del., a corporation of Delaware
No Drawing. Filed May 24, 1965, Ser. No. 458,411
1 Claim. (Cl. 260—230)

ABSTRACT OF THE DISCLOSURE

In a process for preparing organic acid esters of cellulose, wherein a primary cellulose ester is hydrolyzed in an acid medium to form a secondary cellulose ester and said secondary cellulose ester is then precipitated from the hydrolyzed solution, the adidtion of at least about 300 parts per million, based on the weight of the secondary cellulose ester, of the tetrasodium salt of ethylenediaminetetraacetic acid or the pentasodium salt of diethylenetriaminepentaacetic acid to the system prior to the precipitation of the secondary cellulose ester results in a stabilized product.

---

This invention relates to the manufacture of organic esters of cellulose, and particularly to stabilized esters having unusually low levels of free acidity.

In the usual commercial process for preparing organic acid esters of cellulose, e.g., cellulose acetate, the primary or fully esterified cellulose is first prepared by treating cellulose with an organic acid anhydride in the presence of a catalyst, e.g., sulfuric acid, and of an organic acid which is a solvent for the cellulose ester. The primary ester is then hydrolyzed, again in an acid medium, to form a secondary cellulose ester with a lower degree of esterification and more desirable solubility characteristics. The ester is then precipitated from the hydrolysis solution by addition of a non-solvent, washed, purified, and dried.

It has long been recognized that high levels of residual acidity in the cellulose ester product lead to degradation, decomposition, and/or discoloration. In fact, a standard measure of stability of a cellulose ester is a determination of its acidity. Degradation resulting from excess acidity may be manifested in loss of mechanical properties when the esters are used in the form of molded products, or in unsuitable electrical characteristics when the esters are used in lacquers for electrical insulation purposes. The importance of achieving low acidity levels is indicated by the expensive and time-consuming operations employed by the industry to wash and purify the precipitated cellulose esters in the course of their manufacture.

The present invention is directed to a process for producing cellulose esters of lower residual acidity than heretofore obtainable and to the cellulose esters produced by that process. It has been found that cellulose esters of unusually low free acidity can be produced by adding a stabilizing amount of the tetrasodium salt of ethylenediaminetetraacetic acid ($C_{10}H_{12}O_8N_2Na_4$) or of the pentasodium salt of diethylenetriaminepentaacetic acid, to the ester solution at any point during the manufacturing process prior to the precipitation from the hydrolysis solution.

The cellulose esters to which this invention pertains are the conventional organic cellulose esters (simple or mixed) of aliphatic acids, such as cellulose acetate, cellulose propionate, cellulose acetate butyrate, cellulose acetate sorbate, and the like. In its preferred form, this invention is practiced to improve the stability of cellulose acetate compositions. The cellulose acetates comprehended generally have a substitution equivalent between 50% and 62% combined acetic acid. Those cellulose acetates having a substitution equivalent between 52% and 57% combinde acetic acid are preferred.

This invention is particularly applicable to cellulose acetate prepared in the known procedures for acetylating cellulose in the presence of sulfuric acid. The stabilizer of this invention is preferably added to the cellulose ester during the hydrolysis step preceding the precipitation of the secondary cellulose ester.

Although extremely small amounts of stabilizer, such as 300 parts per million, confer some beneficial effect in stabilizing the cellulose ester, generally the stabilizer of this invention is used in amounts ranging from about 400 to about 2000 parts per million by weight based on the cellulose ester. Larger amounts of the stabilizer may be used, but such use is economically undesirable. With cellulose acetate, a preferred range for the amount of stabilizer is from 400 to 700 parts per million.

The cellulose esters stabilized according to this invention may also include other additives for other purposes, such as pigments, fillers, dyes, plasticizers, and other stabilizers intended to combat undesirable effects from other causes, such as ultraviolet light, heat, and the like.

Cellulose esters stabilized in accordance with the present invention are useful in spinning operations to make fibers. They are particularly useful as molding powders and as the base for lacquers for electrical insulation and other purposes. It is in these latter uses particularly, that low levels of acidity in the cellulose ester are essential to maintain satisfactory mechanical properties in molded products and satisfactory electrical properties in lacquers and coatings.

This invention will be further illustrated but is not intended to be limited by the following examples in which all parts are by weight unless otherwise specified. The combined acetic acid levels indicated in Table 1 are measured by conventional procedures, for example, as outlined in ASTM Standard D871–56. The acidity levels of the final products are measured by the following procedure:

*Free acidity.*—A 25 gram sample of cellulose acetate flake, or other cellulose ester, ground to pass a 40-mesh screen, is placed in a 15 oz. bottle with 300 ml. of demineralized water. The mixture is shaken well for 30 minutes at room temperature. The test sample, together with a blank of demineralized water, is titrated with 0.01 N sodium hydroxide with 1 ml. of meta-cresol purple as indicator. Results are calculated as percent acetic acid on the weight of the ground sample.

EXAMPLES

A number of batches of cellulose acetate, ranging in weight from about 2000 to about 6500 lbs., are prepared by the conventional procedure of acetylation of cellulose by acetic anhydride in the presence of a sulfuric acid catalyst. For some of the batches, the procedure is modified according to this invention to provide for the incorporation of the stabilizer to reduce the residual acidity of the final cellulose acetate product.

Item A, not according to this invention, is made by the conventional procedure. A charge of 100 parts of cotton linters pulp having a degree of polymerization of approximately 2100 is steeped in 330 parts of glacial acetic acid for approximately 1.5 hours until thorough wetting is attained. An additional 365 parts of glacial acetic acid is added together with 5 parts of sulfuric acid. After thorough mixing, 215 parts of acetic anhydride are added at a controlled rate with cooling of the vessel to keep the temperature below 55° C. The mixture is then stirred for approximately 1 hour until the desired viscosity is reached, according to conventional procedures. To terminate the acetylation reaction and to prevent further drop in viscosity, 80 parts of 56% acetic acid are added over a period of 5 minutes, and stirring is continued there-after for 10 minutes. At this point, the cellulose has all been converted to the form of a primary ester.

The solution is then transferred to another vessel and the hydrolysis of the primary ester to a secondary ester is initiated by the addition of 410 parts of 56% acetic acid. The solution, maintained at 60° C., is continuously stirred for 3 hours. At the end of this time, 400 parts of 18% acetic acid are added and vigorous stirring is continued at 60° C. for 3 hours, or until the desired level of combined acetic acid (measured by conventional procedures) is reached.

The solution is then filtered and the secondary cellulose acetate is precipitated from solution by the addition of 2500 parts of weak (0 to 4%) acetic acid. The flake is then filtered from the supernatant liquor, washed with filtered ground water containing about 65 parts per million of hardness (calculated as calcium carbonate) to leach out excess acid and to stabilize the combined sulphate groups, pressed to remove excess water, and dried. Free activity is determined for the dried flake as previously described.

Item B is prepared by the same procedure as for Item A except that in the course of the hydrolysis step, at the point where 18% acetic acid is added, there is also added a mixture in the ratio of 1:8 (a) a concentrated aqueous solution of a technical grade of the tetrasodium salt of ethylenediaminetetraacetic acid and (b) 56% acetic acid, in a quantity calculated to give 500 parts per million of stabilizer based on the cellulose acetate. Item B is thus prepared according to this invention. Following the addition of the stabilizer during the hydrolysis step, the remainder of the preparation is continued exactly as for Item A.

Items C, D, E, F, and G, all according to this invention, are other batches of product prepared in the same manner as Item B, that is, by the general conventional procedure of Item A modified by the incorporation of the tetrasodium salt of ethylenediaminetetraacetic acid during the hydrolysis step. The proportions of parts are exactly the same as in Items A & B.

Item H is prepared in the same manner as Items B through G, except that the stabilizing compound added is the pentasodium salt of diethylenetriaminepentaacetic acid in an amount to give 625 parts per million on the basis of the final cellulose acetate product.

For each of the items, there is calculated the percent combined acetic acid, the parts per million of stabilizer added and the percent free acidity. Results of these determinations are given in Table 1.

TABLE 1

| Item | Combined Acetic Acid, percent | Stabilizer, p.p.m. | Free Acidity, percent |
|---|---|---|---|
| A (control) | 55.7 | 0 | 0.029 |
| B—Sample: | | | |
| 1 | 55.65 | 500 | 0.000 |
| 2 | 55.79 | 500 | 0.000 |
| 3 | 55.76 | 500 | 0.001 |
| C—Sample: | | | |
| 1 | 55.70 | 500 | 0.000 |
| 2 | 55.80 | 500 | 0.000 |
| 3 | 55.75 | 500 | 0.000 |
| D | 55.4 | 500 | 0.000 |
| E | 55.50 | 500 | 0.000 |
| F | 55.20 | 500 | 0.000 |
| G—Sample: | | | |
| 1 | 55.10 | 500 | 0.000 |
| 2 | 55.22 | 500 | 0.000 |
| 3 | 55.05 | 500 | 0.000 |
| H | 55.30 | 625 | 0.009 |

From the data in Table 1, it will be seen that incorporation of the tetrasodium salt of ethylenediaminetetraacetic acid as a stabilizer, according to this invention, essentially eliminates free acidity in the final cellulose acetate product. Useful but less effective stabilization is imparted by the chemically related compound used in Item H. In many cases addition of the stabilizer effects a significant reduction in hydrolytic acidity as well. To determine hydrolytic acidity, dried cellulose acetate flake is ground to a fineness such that it will pass through a 40-mesh screen. A 15 gram sample of the ground flake in 250 ml. of demineralized water is heated on a steam bath at 98 to 100° C. for 4 hours. The test sample, together with a blank of demineralized water, is titrated with 0.025 N sodium hydroxide with 1 ml. of meta-cresol purple as indicator. Results are calculated as percent acetic acid on the weight of the ground sample.

It is thus apparent that the present invention provides for the production of cellulose acetate having a hitherto unobtainable low level of residual acidity. Such stabilized cellulose acetate is particularly useful for molding powders and as a base for lacquers for electrical insulating purposes. In both of these applications, low acidity levels are essential to prevent degradation of the cellulose acetate and consequent deterioration of mechanical and electrical properties. Stabilized cellulose acetate made according to this invention can also be used for the manufacture of cellulose acetate yarns according to conventional spinning procedures. The tetrasodium salt of ethylenediaminetetraacetic acid and the pentasodium salt of diethylenetriaminepentaacetic acid employed as stabilizers in this invention are useful for cellulose acetates over the commercially useful range of combined acetic acid levels.

A further advantage of the invention is that it permits substantial economies in the washing, purifying, and associated steps in the manufacturing process. As a consequence of the incorporation of the stabilizer, less extensive washing and lower quantities of wash water are required to achieve satisfactorily low levels of residual acidity, and the resulting burden on the acid recovery system conventionally employed in commercial cellulose acetate processes is correspondingly reduced.

The examples previously given are understood to be for purposes of illustration only and the invention is not to be considered limited except as defined in the appended claim.

What is claimed is:

In a process for preparing secondary cellulose acetate wherein a primary cellulose acetate is hydrolyzed in an acid medium to form a secondary cellulose acetate and said secondary cellulose acetate is then precipitated from the hydrolysis solution, the improvement comprising, incorporating a stabilizing amount of from about 400 to 2000 parts per million based on the weight of the secondary ester of a member of the group consisting of the tetrasodium salt of ethylenediaminetetraacetic acid and the pentasodium salt of diethylenetriaminepentaacetic acid, with the secondary cellulose acetate prior to the precipitation of the secondary cellulose acetate from the hydrolysis solution.

References Cited

The Properties and Uses of Ethylenediamine Tetra Acetic Acid and Its Salts, by Martell, Bersworth Chemical Co., Jan. 20, 1950.

MORRIS LIEBMAN, *Primary Examiner.*

J. FROME, *Assistant Examiner.*